(No Model.)
A. CIRKEL.
APPARATUS FOR STORING, HANDLING, AND TRANSPORTING LIQUIDS.
No. 486,691. Patented Nov. 22, 1892.
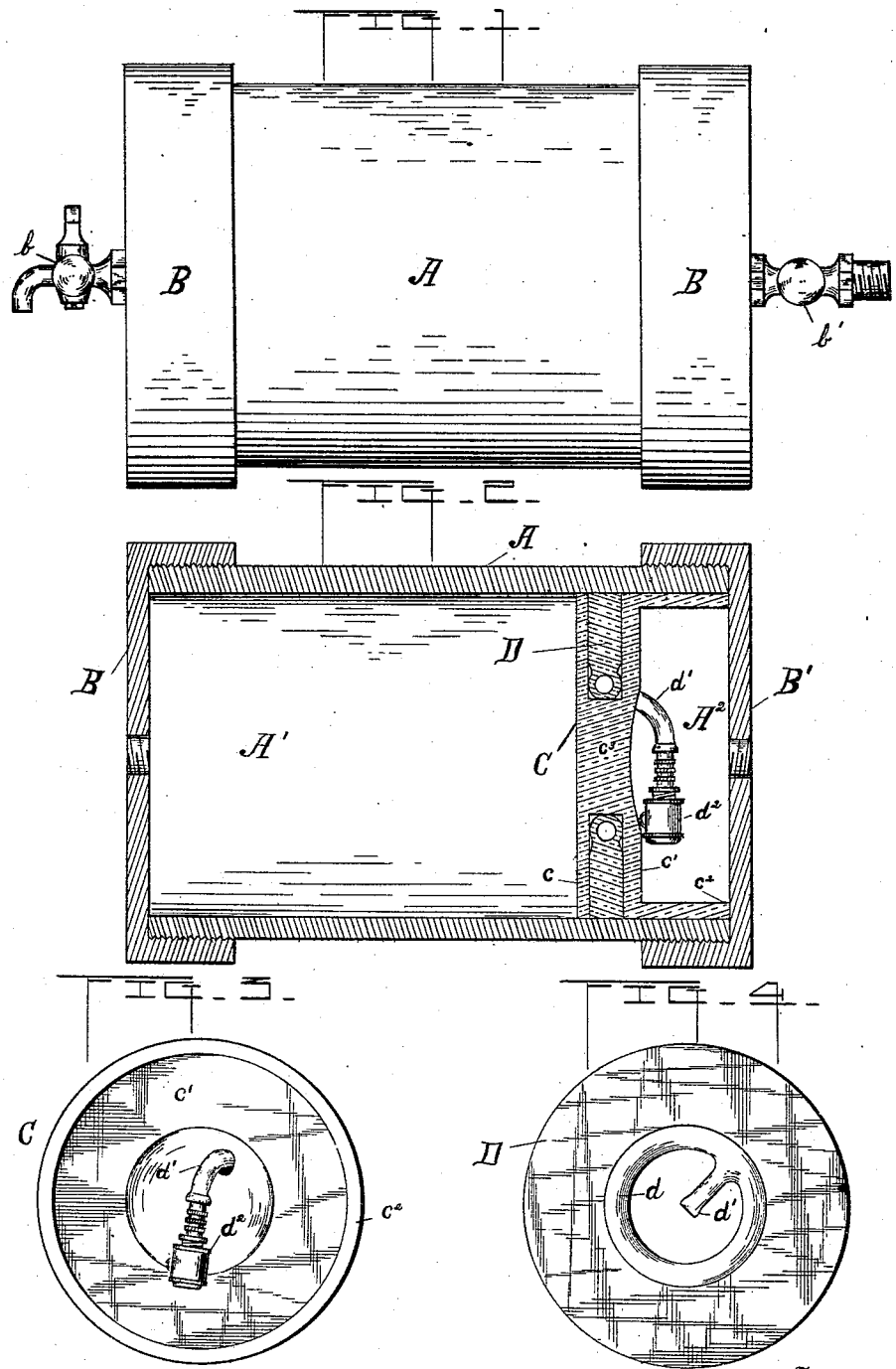

UNITED STATES PATENT OFFICE.

AUGUST CIRKEL, OF BOYD, WISCONSIN.

APPARATUS FOR STORING, HANDLING, AND TRANSPORTING LIQUIDS.

SPECIFICATION forming part of Letters Patent No. 486,691, dated November 22, 1892.

Application filed February 23, 1892. Serial No. 422,507. (No model.)

*To all whom it may concern:*

Be it known that I, AUGUST CIRKEL, a citizen of the United States, residing at Boyd, in the county of Chippewa and State of Wisconsin, have invented certain new and useful Improvements in Methods and Apparatus for Storing, Handling, and Transporting Liquids; and I do hereby declare the following to be a full, clear, and exact description of the invention, such as will enable others skilled in the art to which it appertains to make and use the same.

My invention relates to an improved apparatus for storing, handling, and transporting liquids, particularly mineral waters, aerated drinks and beverages, illuminating-oils, &c.; and the object is to provide simple and efficient means for packing or storing, preserving, handling, transporting, and drawing off such liquids for use without permitting air to enter the containing cask or vessel or come in contact with any portion of the liquid, so as to reduce its strength or quality.

The invention will first be described in connection with the accompanying drawings, and then pointed out in the claims at the end of this description.

Referring to the drawings, in which similar letters of reference are used to denote corresponding parts, Figure 1 is a side elevation of a cask or vessel embodying my invention. Fig. 2 is a longitudinal sectional elevation of the same. Fig. 3 is a rear elevation of the movable partition or piston, and Fig. 4 is a similar view of the elastic piston packing-ring detached from the piston.

A in the drawings denotes a suitable cask or vessel, which may be of any desired form, though preferably cylindrical in cross-section. B B' are removable heads or caps for the ends of the cylinder and may be attached thereto by the screw-threaded connection, as shown, or in any proper manner. One of these heads, as B, is provided with a faucet $b$, and the other, as B', with an air-cock $b'$. Within the cylinder A is fitted a movable partition or piston C, which is composed of two circular disks or plates $c$ $c'$ (one of which is provided with a circumferential flange or projection $c^2$ to support and guide the piston in its movements back and forth and prevent it from canting or tilting) and an elastic packing-ring D. The disks $c$ $c'$ may be formed either integrally with or connected to a central portion or hub $c^3$, so as to provide between the disks and around the hub an annular recess or groove to receive and hold the ring D, which may be composed of india-rubber or other suitable material and which is adapted to lie snugly within the annular recess and bear tightly against the interior surface of the cylinder A, so as to form an air-tight connection therewith. The piston C divides the interior of the vessel A into two air and water tight compartments A' A², as indicated in Fig. 2. The diameter of the rubber ring D is preferably somewhat greater than that of the disks, so that it will be compressed between the sides of the vessel and the hub of the piston, and thus cause the piston to work air and water tight within the cylinder. This ring may consist of a single piece of rubber or other suitable material or composition; but I preferably form a solid exterior ring D of rubber and secure thereto or form integral therewith a second hollow inner ring $d$, in which latter case the hollow rubber ring is provided with a tube $d'$, which projects through an aperture in the hub or hub and disk $c'$ of the piston, the tube $d'$ being provided with an air-cock $d^2$, by which the rubber ring may be inflated for the purpose of forcing the solid ring of rubber tightly against the interior of the cylinder A. The air-cock $d^2$ of the tube $d'$ is provided with a suitable check-valve adapted to permit the air to be blown or forced into the tubular ring for the purpose of expanding the packing and to prevent a return of the air entering the tube.

In filling the vessel or cylinder A the piston C is placed closely against the end of the cylinder containing the faucet $b$, so as to force out any air that may be confined in that end of the cylinder. The liquid is then forced into the chamber A' through the faucet $b$, and as the piston C yields to the pressure of the incoming fluid the air behind the piston is driven toward the opposite end of the cylinder and expelled through the air-cock $b'$, so that one chamber is exhausted as the other is filled. The liquid being thus confined in an air-tight vessel may be preserved for any length of time and handled, transported, transferred from vessel to vessel, or withdrawn wholly or in part at intervals without admitting air to the remaining portion, thus preserving the liquid free from contact with the air, which may reduce its strength and quality. To accomplish the withdrawal, an air-forcing apparatus is connected with the air-cock $b'$, and thereupon by opening the cock $b$, the desired quantity of liquid may be withdrawn by forcing air through the cock $b'$, so as to drive out the liquid in the opposite chamber through the open faucet $b$. In this manner various kinds of beverages and volatile liquids may be stored and transferred from place to place or from vessel to vessel and subsequently withdrawn without loss of strength or quality by contact with the air, and, if desired, may be divided, subdivided, handled, and rehandled without exposure to the air.

It may sometimes be desirable to store and withdraw the liquid without using an air-forcing apparatus for effecting the expulsion of the liquid by pressure, as in the case of dispensing beverages of various kinds in small quantities or by the glassful. In such cases only one sealed compartment or chamber is necessary, the movable partition or piston being actuated by means of any suitable adjusting device—as, for instance, an ordinary screw-rod disconnected from the piston and adapted to force the same in one direction only.

I am aware that it has heretofore been proposed to provide vessels for storing liquids and for other purposes with movable heads or pistons, and I therefore do not claim, broadly, a storage-vessel with a piston working therein. The vessel may also be filled by exhausting the air from the air-chamber $A^2$ and simultaneously running the liquid into the chamber $A'$ through the faucet $b$, instead of forcing the liquid through said faucet into the chamber against the piston C, so as to drive out the air confined in the opposite chamber.

Having thus described my invention, what I claim, and desire to secure by Letters Patent, is—

1. The combination, with the air-tight vessel and means for admitting and withdrawing liquid therefrom, of a movable partition or rodless piston consisting of the disks connected by a central hub, one of said disks being provided with an annular peripheral flange adapted to prevent tilting or canting of the partition, and an expansible packing arranged between the disks, substantially as described.

2. In combination with the cylindrical vessel having the removable heads provided with faucet and air-cock, as described, the movable partition or rodless piston having the annular recess therein, and the expansible ring seated in said recess, comprising a solid outer ring and a tubular inner ring, together with an air-cock connecting said tubular ring with the air-chamber behind the piston, substantially as described.

3. In combination with the cylindrical vessel, the movable head or piston provided with the circumferential recess or groove and the expansible packing seated in said groove, said packing consisting of a solid outer elastic disk or ring having a tubular inner elastic ring integral therewith, and an air-inlet tube with check-valve therein, communicating with said tubular ring, substantially as described.

4. In combination with the cask or vessel having the air-tight compartment and means for introducing and withdrawing liquid therefrom, the movable head or piston comprising a central portion or hub having disks formed integrally therewith and separated so as to provide an annular recess encircling said hub, the expansible packing-ring comprising an outer solid ring and an inner tubular ring, seated in said recess between said disks, and the guiding and supporting flange rigid with one of said disks, substantially as described.

In testimony whereof I affix my signature in presence of two witnesses.

AUGUST CIRKEL.

Witnesses:
W. F. CIRKEL,
A. R. McDONALD.